United States Patent [19]
Auer, Jr. et al.

[11] 3,794,834
[45] Feb. 26, 1974

[54] MULTI-COMPUTER VEHICLE CONTROL SYSTEM WITH SELF-VALIDATING FEATURES

[75] Inventors: John H. Auer, Jr., Fairport; Donald B. Marsh, Rochester; Henry C. Sibley, Adams Basin, all of N.Y.

[73] Assignee: General Signal Corporation, Rochester, N.Y.

[22] Filed: Mar. 22, 1972

[21] Appl. No.: 237,196

[52] U.S. Cl.................. 246/187 B, 340/146.1 C
[51] Int. Cl............................................. B61l 27/04
[58] Field of Search........... 246/187 B; 340/146.1 C

[56] References Cited
UNITED STATES PATENTS
3,268,727  8/1966  Shepard .................. 246/187 B
3,449,717  6/1969  Smith et al................ 340/146.1 C Primary Examiner—Gerald M. Forlenza
Assistant Examiner—George H. Libman
Attorney, Agent, or Firm—Milton E. Kleinman

[57] ABSTRACT

An automatic vehicle control system for controlling the operation of a vehicle from a set of parallel operating computers in a central control station. A data communication link transmits vehicle performance reports from the vehicle to the central control station and transmits vehicle command messages from the central control station to the vehicle. Validating circuitry in the vehicle validates received vehicle command messages by verifying the messages originated from both computers in the central control station. A portion of the vehicle command message included in the vehicle performance report is subsequently used by the two computers to validate the performance report message transmitted from the vehicle to the central control station.

17 Claims, 5 Drawing Figures

MULTI-COMPUTER VEHICLE CONTROL SYSTEM WITH SELF-VALIDATING FEATURES

BACKGROUND OF INVENTION

This invention relates to a multi-computer vehicle control system and more particularly to self-validating features required in such a system to insure the safe operation and control of the vehicle.

Vehicle control systems have been developed to a high degree in the railroad industry where automatic signalling systems and centralized traffic control are used to provide the train operator with information to control the trains in accordance with a predetermined schedule for train movement. Some of these vehicle control systems have included the use of computers at a central office. Although the calculations for vehicle control could easily be performed in the central office, sufficient equipment and control had to be retained in the vehicle to insure the safe operation and control of the vehicle in the event computer circuitry failed or the computer program malfunctioned. In practice, the computer in the central only provided information to an operator for the train and such information was only utilized at the discretion of the train operator.

Obviously, the use of redundant control equipment on each train and the use of an operator on each train affects not only the basic price of the train, it additionally inflates the operating cost of the train by requiring a train operator. Such systems are of course not desirable in a people-mover system where a large number of small vehicles is used in relatively small but dense areas of population. For such systems employing a large number of vehicles to be economically established and operated it is desirable that the cost of each of the vehicle be miminized by reducing the amount of control equipment on each vehicle. It is further desirable to limit the operating cost of each vehicle by having the vehicles automatically controlled from a central control station.

SUMMARY OF INVENTION

In accordance with the features of this invention which provide the above-mentioned improvements for a vehicle control system, the vehicle control system provides for the control of vehicles from a set of parallel operating computers in a central control station. A data communication link transmits vehicle performance reports from the vehicle to the central control station and transmits vehicle command messages from the central control station to the vehicle. Each of computers is programmed to compute speed control commands for the vehicle. Command messages are compiled in the central control station by merging portions of data transferred from each of the computers in a compiling register. In addition, data from each of the two computers is directly entered into separate portions of the compiling register. An on-line control system for decoding vehicle command messages and assembling performance report messages is included in the vehicle. The on-line control system includes logic circuitry for formatting vehicle command messages transferred from the control station to the vehicle. A vehicle command message includes an identity word that partially includes data transferred directly from each of the computers to the compiling register and a portion of the data merged in the compiling register from both computers. Address recognition circuitry on the vehicle tests the identity word to ascertain that the vehicle command message is intended for the particular vehicle and a validating circuit validates the received message by testing the identity word to ascertain that the vehicle command message was compiled from both computers. The concurrent operation of both computers calculating the same vehicle command message data is thus verified. In this manner, the use of redundant equipment to insure the safety of the system is obtained by the two computers in the central control station independently verifying the vehicle's performance and computing the vehicle instruction commands. The concurrence of the computational activity of both computers as determined by the validating circuitry insures that the command data is reliable and authentic.

Accordingly, one of the objects of this invention is to provide a vehicle control system for a people-mover transportation system that obviates limitations of the described train control systems.

Another object of the present invention is to provide a self-validating safety control system for use in an automatically operated vehicle controlled from a central control station having a plurality of digital computers.

It is a further object of the present invention to provide an on-line control system in each of the vehicles for use in conjunction with a multi-computer central control station, which on-line system provides a validating test for the concurrent operation of the computers.

For a better understanding of the present invention together with other and further objects thereof, reference is directed to the following description taken in connection with the accompanying drawings, while its scope will be pointed out in the appended claims.

DESCRIPTION OF THE PREFERRED EMBODIMENTS

Figure 1:
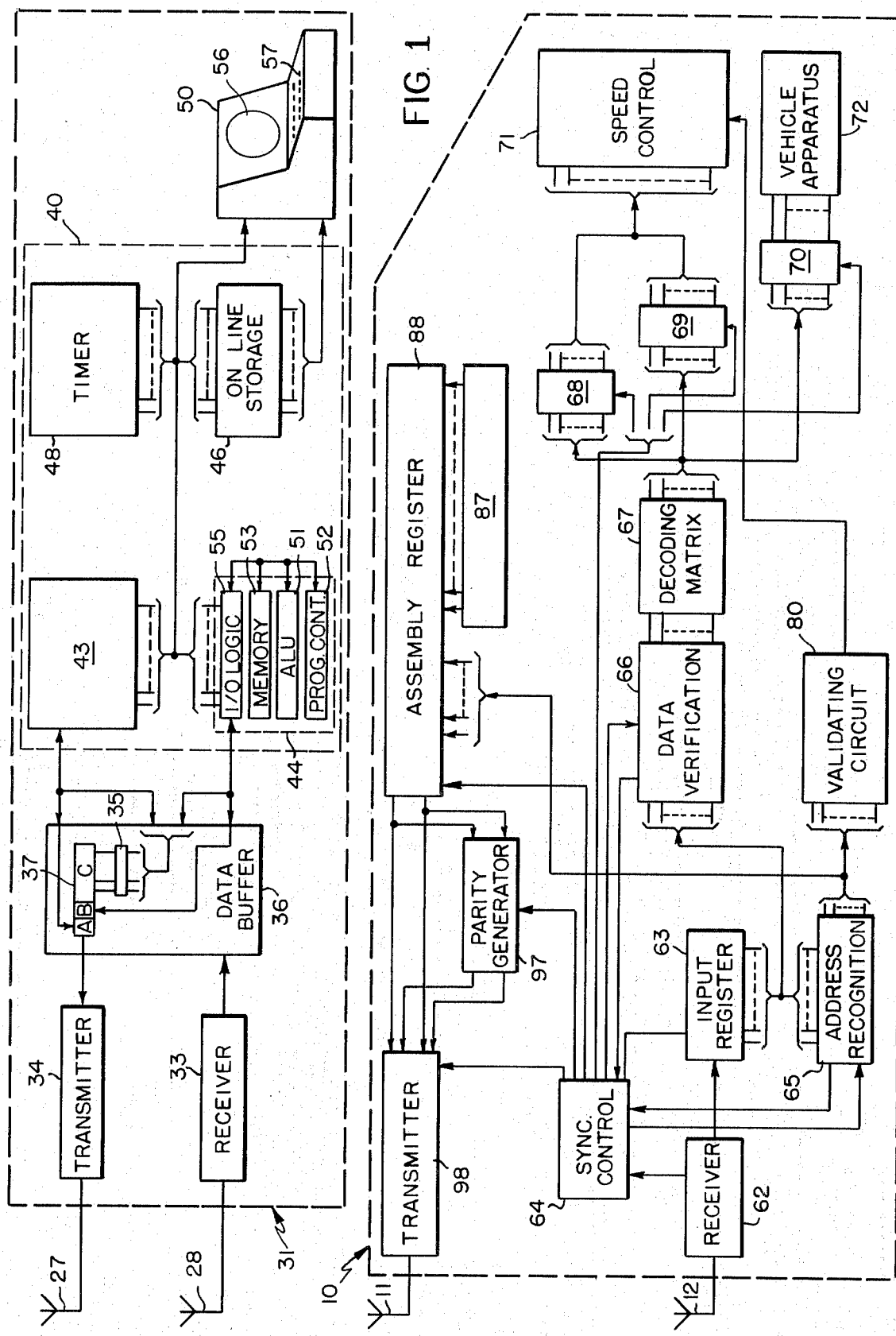
FIG. 1 is a block diagram representation of a multi-computer vehicle control system wherein a vehicle is automatically controlled from a central control station.

The overall view of a multi-computer vehicle control system with self-validating features is shown in FIG. 1 depicting on-line control circuitry in a vehicle 10 that is controlled by a central control station 31. Binary data is transmitted between vehicle 10 and central control station 31 via a data communication link extending from antennas 27 and 28 at the central control station to antennas 11 and 12 on the vehicle 10. The data is transmitted in the form of two high frequency signals, the change of the signal from one frequency to the other indicating the presence of a corresponding "ZERO" or "ONE" binary digit. This non-return-to ZERO (NRZ) communication format enables a high rate of data transmission by decreasing the number of signal transitions, ie., frequency shifting, necessary to transmit a block of data. The signals received at the central control station 31 by a receiver 33 are decoded and serially transferred to a data transfer buffer 36 wherein the data is formatted in word lengths for parallel transfer to a computer set 40.

Figure 2:
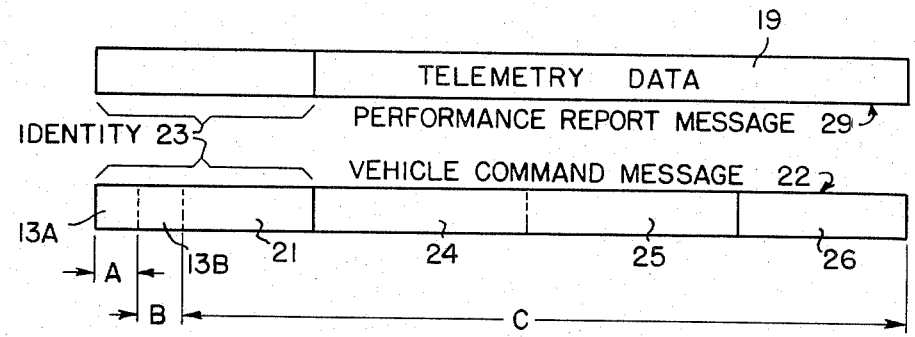
FIG. 2 illustrates a format of the vehicle plan message transmitted from the central control station to the vehicles and a format of the vehicle performance report message transmitted from each vehicle to the central control station.

The computer set 40 includes two computers 43 and 44 connected for inter-computer data transfers and commonly connected to an on-line memory storage unit 46, such as a magnetic disc memory, and a timer 48 synchronizing the operation of the two computers 43 and 44 and providing the computers with clocking signals to record the elapsed time during control of the vehicle 10. A vehicle performance report message 29 shown in FIG. 2 is received from the vehicle 10 and transferred from receiver 33 through the connecting data buffer 36 to computers 43 and 44.

Messages transmitted to the vehicle 10 from the central control station 31 are formed in part by merging portions of data transferred from computers 43 and 44 through AND gates 35 and storing the results in portion C of a compiler register 37 in the data buffer 36. In addition, data transferred from computer 43 bypasses AND gate 35 and is directly entered into portion A of compiler register 37, and data transferred from computer 44 is directly entered into portion B of compiler register 37. The data stored in portions A, B and C of compiler register 37 forms a vehicle command message that is serially transferred to transmitter 34 for transmission from antenna 27 to antenna 12 on vehicle 10. The format of a vehicle command message 22 is shown in FIG. 2 where it is seen to include four data words of equal length. A first word 23 is an identity word including an address portion 23. A second word 24 and a third word 25 form a speed control command to control the acceleration and braking mechanism of the addressed vehicle. A fourth word 26 includes discrete signals to operate doors and other apparatus on the addressed vehicle. Portions A, B and C of the compiler register 37 are identified in the vehicle command message 22 shown in FIG. 2 where it is seen that data portions A and B transferred directly from computers 43 and 44, respectively, correspond to computer validating fields 13A and 13B in the identity word 23. In addition, the identity word 23 includes a segment of data portion C identified as address field 21 that has been transferred through AND gates 35 from computers 43 and 44.

The computers 43 and 44 are similar in construction and component parts typical of the computers 43 and 44 are shown only for computer 44. The computer 44 is comprised of an arithmetic and logic unit 51 (ALU 51), controlled by a program control 52 and cooperating with a memory 53. The transfer of data between memory 53 and devices peripheral to the computer 44 is initiated under program control through I/O logic 55 which connects to correcponding circuitry of the computer 43, the on-line storage unit 46, and an operator console 50. The on-line storage unit 46, typically a magnetic disc storage unit, provides a large storage capacity for pre-calculated tables of vehicle parameters. The use of such tables to ascertain vehicle parameters reduces the calculation load on the computers 43 and 44, it being understood that table look-up can be accomplished much quicker than involved calculations pertaining to the velocity, forward clearance, relative velocity and stopping distance of the vehicles. This efficient use of computer processing time reduces the computation time required for each iteration of programs and the described vehicle transportation system is controlled on a real-time basis. The operator console 50 includes CRT display 56 for monitoring the operation of the automatically controlled vehicles and a keyboard entry 57 for manual insertion of control data and intilization of vehicle 10 to transmit.

Still referring to FIG. 1, there is shown a schematic representation of an on-line vehicle control system included on the vehicle 10. Vehicle command messages transmitted from the central control station 31 are received by antenna 12 connecting to a receiver 62. The receiver 62 demodulates, filters and amplifies the received signals before serially transferring such signals to an input register 63. A sync control circuit 64 connecting to the receiver 62 monitors the data transfer through the receiver 62 and the sync control circuit 64 provides shift pulses to the input register 63 to coincide with the flow of data through the receiver 62. The sync control circuit 64 additionally connects to an address recognition logic circuit 65 which compares the address field 21 of the identity word 23 of the vehicle command message 22 shown in FIG. 2 to a preset logic pattern stored in the address recognition circuit 65. If the two binary signal patterns correspond, the entire word is strobed from the input register 63 to the address recognition circuit 65. In addition, a confirming signal to the sync control circuit 64 enables the transfer of subsequent words in the vehicle command message from receiver 62 to the input register 63. The identity word 23 strobed from the input register 63 to the address recognition circuit 65 is gated to an assembly register 84 and to a validation circuit 80 which is more particularly shown in FIG. 3. However, if such comparison is not favorably made by the address recognition logic 65, a signal to the sync control circuit 64 inhibits the transfer of subsequent data from the receiver 62 to the input register 63.

Each subsequent word received by input register 63 is validated by a connecting data verification logic 66 which parity checks the word by requiring only two one bits in a word of five bits. Upon validation of the input word by the data verification logic 66, the input words are gated through a decoding matrix 67 and strobed into a first register 68, a second register 69 and a third register 70, in that order, by the sync control circuit 64. The data stored in registers 68 and 69 is inputted to a speed control unit 71 which controls the acceleration and braking of the vehicle in accordance with the stored input data. The data strobed into register 70 is outputted to vehicle apparatus 72 wherein the signals are used to control such items as the opening and closing of doors, the operation of a loudspeaker system, additional signals for passengers and other vehicle apparatus.

The movement of the vehicle 10 is monitored by telemetry circuit 87 connecting to an assembly register 88. When a vehicle command message has been received by the vehicle 10, the sync control circuit 64 initiates the transfer of a return message from the vehicle 10 to the central control station. The sync control circuit 64 strobes the identity word from the address recognition circuit 65 and data from the telemetry 87 into the assembly register 88 to form the performance report message 29 shown in FIG. 2, including an identity word 23 and a telemetry data field 19. The performance report message 29 in the assembly register 88 is serially shifted past a parity generator 97 to a transmitter 98 where the data is transmitted from antenna 11 on the vehicle 10 to antenna 28 on the central control station. The parity generator 97 adds parity digits to the transmitted message that is verified by the receiving equipment.

Figure 3:
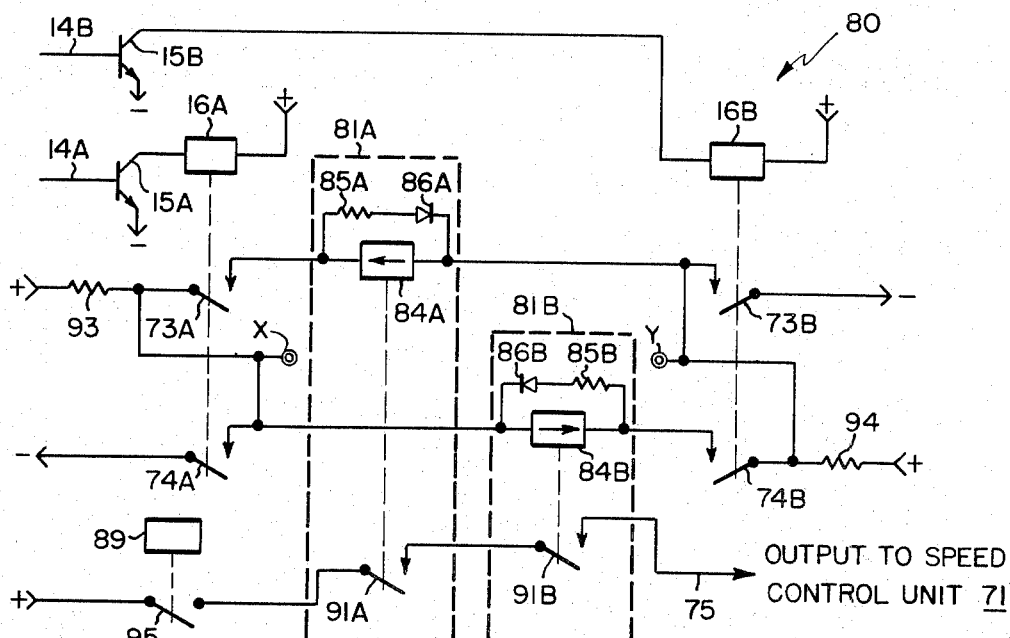
FIG. 3 is a the schematic representation of the validating circuitry shown in the block diagram of the vehicle control system in FIG. 1.

The validating circuit 80 will now be more particularly described with reference to the circuitry shown in FIG. 3, with occasional reference to the vehicle command message 22 shown in FIG. 2 and the system diagram of FIG. 1. Input lines 14A and 14B correspond to a signal from each of computer validating fields 13A and 13B, respectively, of the identity word 23 included in the vehicle command message 22 that has been strobed from input register 63 to address recognition circuit 65 and transferred to validating circuit 80. Input leads 14A and 14B each connect to a driver circuit 15A and 15B, respectively. A control relay 16A is energized by a signal on input line 14A to driver 15A and a second control relay 16B is energized by a signal on input ine 14B to driver 15B. Control relays 16A and 16B are shown as relays with rapid switching responses or alternately, they may be semiconductor switches with two normally open gate circuits. The (+) and (−) designations on FIG. 3 indicate the polarity of supply voltages that are maintained to the circuitry. Control relay 16A has associated with it normally-open switch closures 73A and 74A and control relay 16B has associated with it normally-open contact closures 73B and 74B. A first and second refresh circuit 81A and 81B are connected to the contact closures 73A and 74A, and 73B and 74B controlled by relays 16A and 16B, respectively. Refresh circuit 81A is seen to include a polar biased relay 84A which energizes and remain energized with current flowing through the coil or relay 84A in the direction indicated by the arrow thereon. Connected in parallel to the polar biased relay 84A is a resistor 85A of typically 100 ohms in series with a diode 86A, the polarity of the diode is arranged to provide a discharge route for induced voltage from the coil of relay 84A through resistor 85A and diode 86A. This circuitry parallel to the coil of relay 84A provides a current path for the collapsing field of the relay coil thus delaying release of the relay when the drive voltage is removed from the relay coil. The duration of the time delay is dependent on the value of resistor 85A. Normally open relay closures 91A is actuated by relay 84A. Refresh circuit 81B similarly includes a polar biased relay 84B, a parallel circuit including resistor 85B and diode 86B, and contact closure 91B. An SCRX relay 89 is actuated by the sequential testing of conditions precedent for the vehicle to start moving and to continue moving. The energization of SCRX relay 89 provides a continuity through contact closure 95. Resistors 93 and 94 are current limiting impedances for the indicated power supply voltage. Circuit test points X and Y are inserted on the schematic of FIG. 3 to clarify the following description of the disclosed circuitry with reference to the timing diagram of FIG. 4.

Figure 4:
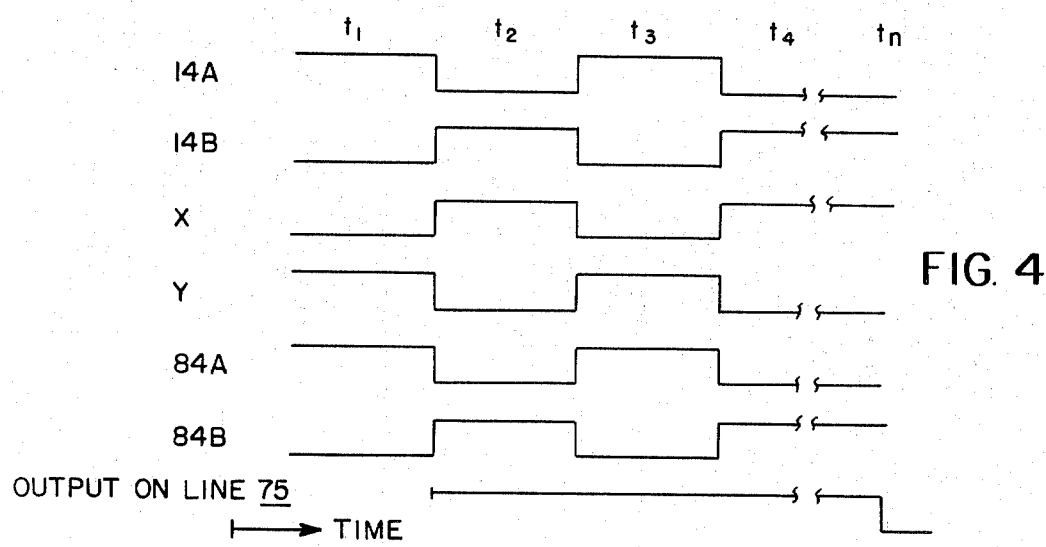
FIG. 4 is a timing diagram descriptive of signals associated with the circuitry of FIG. 3 as the circuit operates in the system of FIG. 1.

The circuitry of FIG. 3 will not be described with reference to the timing diagram of FIG. 4 depicting the changing signals on input leads 14A and 14B, the resultant voltage changes at test points X and Y, the periods when relays 84A and 84B are refresh energized by currents between points X and Y, and the signal output level on line 75 to speed control unit 71. At time $t_1$, for example, it is seen that the signal at line 14A is plus or present and signal at line 14B is minus or absent. The plus signal at line 14A causes driver 15A to conduct, thereby energizing control relay 16A and causing contact closures 73A and 74A to close. The closure of contact 73A produces a negative voltage level at test-point X. The signal input at 14B is absent and hence control relay 16B is deenergized, contact closures 73B and 74B are normally open and a positive level exists at test-point Y. With test-point Y positive and test-point X negative, the current proceeds from point Y to point X and hence only polarized relay 84A can be energized at this time as indicated on the timing chart and relay 84B is not energized by the current flow at this time. At time $t_2$, the signal level at 14A is absent thereby causing control switch 16A to deenergize and open contact closures 73A and 74A. However, a signal level present at lead 14B causes driver 15B to conduct, energizing control relay 16B and contact closure 73B and 74B close. At this time it is seen that test-point X is positive and test-point Y is negative and current flows in the direction from point X to point Y. Current flow in this direction causes a polar biased relay 84B to energize and polar biased relay 84A is not energized by the current flow at this time. However, relay 84A is kept energized by the current discharge path through resistor 85A and diode 86A and relay 94A is not given sufficient time during time $t_2$ to discharge its coil and move its contact closure 91A. Accordingly, at time $t_3$ when a signal is present at 14A and absent at line 14B, the relay 84A is refreshed in its energized state by strengthening the magnetic field of relay 84A that may have been weakened during time $t_2$. In this manner, signal continuity through contact closure 91A is maintained continuously as the signals on lines 14A and 14B alternate as shown in FIG. 4. Similarly, the energization of relay 84B is refreshed during time $t_4$ by the current flow from circuit point X to circuit point Y and the closure of contact 91B is maintained continuously as indicated. In this cyclical manner polar biased relays 84A and 84B are alternately refreshed in their energized state and their respective contact closures 91A and 91B are maintained closed so that the signal level path is maintained from contact closures 95 through contacts 91A and 91B to the speed control unit 71. Time intervals $t_1, t_2, t_3$ and $t_4$ are of approximately equal intervals, typically about 50 milliseconds, and refresh relays 84A and 84B are deenergized if they are not refreshed in a time period of typically 100 to 250 milliseconds, i.e., two to five time intervals $t_n$. It is readily seen that in the event the signal levels on lines 14A and 14B cease to alternate in the described manner, as indicated during time interval $t_n$, for example, so that relay 84B is not refreshed, relay 84A deenergizes thus opening its contact 91A and thereby changes the signal to the speed control unit 71. The loss of a signal on line 75 to speed control unit 71 indicates that command data from one of the computers 43 or 44 is unreliable and possibly invalid and the vehicle proceeds to immobilize itself.

Figure 5:
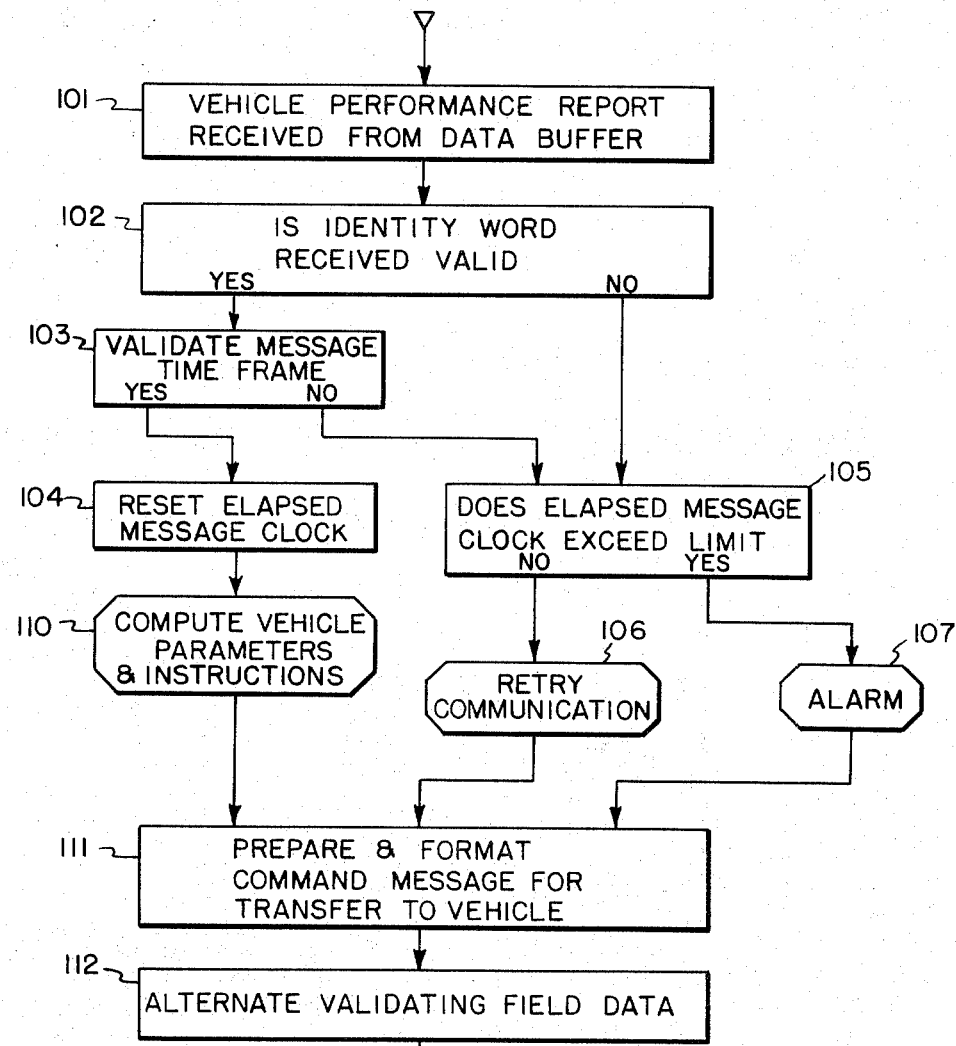
FIG. 5 is an illustrative flow chart of the programmed operation of the computers in the central control station shown in FIG. 1.

Referring again to FIG. 1, the programmed operation of computers 43 and 44 will be described with reference to the system flow charts shown in FIG. 5 and the message format shown in FIG. 2. The flow chart shown in FIG. 5 describes the computer program executed in computers 43 and 44 by the program control unit 52 in response to repetitive communications from the vehicle 10. Vehicle performance report messages 29 are received by computers 43 and 44 from the data buffer 36 as indicated in block 101. In block 102 the identity word 23 in the vehicle performance report 29 is validated by comparing it with the identity word 23 in the previously transmitted vehicle command message 23 to the vehicle 10. In block 103, the vehicle performance report is further validated by confirming it was received in a particular time frame following the transfer of the vehicle command message from the computer to the vehicle. If the time frame is validated, the program continues to block 104 to reset an elapsed message clock retained in the computer and advanced by pulses from timer 48. The computer program proceeds to block 110 which includes a series of routines that computes the vehicle's position and velocity from the received telemetry data and samples a vehicle command message including propulsion and braking instructions that is subsequently transferred from the central control station 31 to the vehicle 10. Referring back to blocks 102 and 103, if it were found that the identity word 23 was invalid or the time frame was invalid, the program would proceed to block 105 where the elapsed message clock would be tested to determine if the time since the prior received valid message exceeds a predetermined limit. If such limit were not exceeded, the program would proceed to block 106 to retry communications with the vehicle. If the time limit tested in block 105 had been exceeded, the program would proceed to an alarm routine 107 that curtails the operation of the vehicle. From program routines 106, 107 and 110 the program proceeds to block 111 where a vehicle command message is prepared and formatted. In block 112 binary data for the validating field 13A, for example, shown in FIG. 2 is alternated and vehicle command data is tranferred from computer 43 to data buffer 36, merged in compiler register 37 with data from computer 44 and transmitted to vehicle. It should be noted that during control of a vehicle, the validating fields 13A and 13B from computers 43 and 44, respectively, are cooperatively controlled by inter-computer data transfers so that the validating fields 13A and 13B include complementary signals in each vehicle command message.

The operation of multi-computer vehicle control system will now be described with reference to the block diagram of FIG. 1, the message formats shown in FIG. 2, the schematic representation of the validating circuitry shown in FIG. 3 and the timing diagram of FIG. 4. Vehicle control data is outputted from each of computers 43 and 44 to the data buffer 36. Vehicle command messages 22 are formed in the compiling register 37 by merging portions of data transferred from computers 43 and 44 through gating circuitry 35 and storing the result in portion C. In addition, data transferred from computer 43 bypasses gating circuitry 35 and is directly entered into portion A of compiler register 37 and data transferred from computer 44 is directly entered into portion B of register 37. The identity word 23 of the vehicle command message 22 includes validating data fields 13A and 13B corresponding to data portions A and B of the compiler register 37. In addition, the identity word 23 includes an address field 21 that is a segment of data portion C from register 37.

Vehicle command messages are transferred from the compiler register 37 through the transmitter 34 and received by the vehicle 10. The identity word 23 is entered into input register 63, validated by the connecting data verification logic 66 and the address field 21 is compared by the address recognition logic 65 to the present logic pattern stored therein. A favorable comparison indicates that the command message is addressed to the particular receiving vehicles. Data from validating fields 13A and 13B correspond to signals on lines 14A and 14B, respectively, to the validating circuit 80. A signal level present on-line 14A and absent on-line 14B, for example, causes relay 16A to be energized and relay 16B to be deeenergized and the coil of relay 84A is refresh energized as indicated on FIG. 4 during time $t_1$. Subsequent words 24, 25 and 26 received by the vehicle 10 are validated by data verification logic 66, passed through decoding matrix 67 and strobed into registers 68, 69 and 70, in that order, by sync control circuit 64. The sync control circuit 64 responds to the received vehicle command message 22 by initiating a performance report message 29. The sync control circuit 64 strobes the assembly register 88 to store therein signal inputs from telemetry circuit 87 and address recognition logic 65. The sync control circuit 64 then initiates the serial shifting of data stored in assembly register 88 passed the parity generator 97 to a transmitter 98. The parity generator 97 adds parity bits as the performance report message 29 is transmitted to the central control station 31.

The performance report message 29 is decoded by receiver 33, formatted in data transfer buffer 36 and inputted to safety computers 43 and 44 where the data is validated and assimilated. The computers 43 and 44 prepare an appropriately responsive vehicle command messages 22 as described with reference to the flow chart of FIG. 5. Vehicle command data is again outputted from both computers 43 and 44 for a vehicle command message 22 that is transmitted by vehicle 10. The computers 43 and 44 have alternated binary data in validating fields 13A and 13B of the vehicle command message 22 and a corresponding signal on line 14A is absent and on line 14B the signal is present as indicated during time interval $t_2$ shown in FIG. 4. During this time, relay 16B is energized and relay 16A is deenergized and the coil of relay 84B is refresh energized. The above described sequence is repetitive and it is seen on FIG. 4 that signal levels occurring during time interval $t_3$ correspond to those shown during time interval $t_1$ and signal levels occurring during time interval $t_4$ correspond to those shown during time interval $t_2$. In the event computer 43A, for example, should discontinue outputting data through data buffer 36 to form a vehicle command message 22 in compiler register 37, the signal on line 14A remains absent. Relay 16A remains deenergized, relay 84A ceases being refreshed and becomes deenergized, switch closure 91A opens and the signal on output line 75 to speed control unit 71 drops as indicated during time interval $t_n$ in FIG. 4. Loss of a signal on line 75 to speed control unit 71 negates data received in the vehicle command message 22 from computers 43 and 44 as it is deemed unreliable to control the vehicle. Specifically, the command messages in registers 68 and 69 to speed control unit 71 are inhibited from controlling the acceleration or braking of vehicle 10 and the vehicle proceeds to immobilize itself.

While there has been described what at present is considered to be the preferred embodiment of the invention, it will be obvious to those skilled in the art that various changes and modifications may be made therein without departing from the invention, and it is therefore intended in the appended claims to cover all such changes and modifications that fall within the true spirit and scope of the invention.

What is claimed is:

1. An automatic vehicle control system for a vehicle controlled from a central control station,
   a data communication link between the vehicle and the central control station for transferring vehicle performance reports from the vehicle to the central control station and transferring vehicle command messages from the central control station to the vehicle,
   an on-line control system in the vehicle for decoding vehicle command messages and assembling performance report messages,
   a speed control unit acting in response to the vehicle command message decoded by the on-line vehicle control system for controlling acceleration and braking of the vehicle,
   a computer set in said central control station for computing the vehicle control data that is included in the vehicle command messages transmitted from the central control station to the vehicle, wherein the improvement comprises:
   a data transfer buffer connecting to said computer set providing means for assembling the vehicle command messages for transfer to said vehicle;
   a first and a second computer in said computer set providing means for calculating vehicle speed control data to be included in said vehicle command messages;
   a compiling register in said data transfer buffer providing means for compiling said vehicle command message, said compiling register including a first register portion for storing data transferred from said first computer, a second register portion for storing data transferred from said second computer and a third register portion for storing data transferred from both said first and second computer and merged into said third portion.

2. The automatic vehicle control system of claim 1 wherein a validating field is included in said first register portion and said first computer provides programmed means for alternating data in said validating field in successively compiled vehicle command messages.

3. The automatic vehicle control system of claim 1 wherein:
   a first validating field is included in said first register portion and said first computer provides programmed means for alternating data in said first validating field in successively compiled vehicle command messages,
   a second validating field is included in said second register portion and said second computer provides programmed means for alternating data in said second validating field in successively compiled vehicle command messages, and said first computer is coordinated with said second computer so that alternating data in said first register portion is complementary to alternating data of said second register portion.

4. The automatic vehicle control system of claim 3 wherein:
   an identity word is formed in said compiling register, said identity word including the first validating field formed from said first register portion, the second validating field formed from said second register portion, and an address field formed from said third register portion,
   said on-line control system including an input register, an address recognition circuit operatively connected to said input register, and a validating circuit operatively connected to said address recognition circuit,
   said input register providing storage means for said identity word,
   said address recognition circuit providing means for testing said address field,
   said validating circuit providing means responsive to said address recognition circuit for validating the vehicle command message by testing the coordinated alternating of data in said first and said second validating fields.

5. The automatic vehicle control system of claim 4 wherein a first and second refresh circuit is included in said validating circuit, said first refresh circuit energized by said first validating field, said second refresh circuit energized by said second validating field, said first and second refresh circuits energized in a complementary manner corresponding to the alternating data in said first register portion being complementary to the alternating data in said second register portion.

6. The automatic vehicle control system of claim 5 wherein one of said first and second refresh circuits is deenergized by repetitive data occurring in said first register portion and said second register portion.

7. The automatic vehicle control system of claim 6 wherein said first and second refresh circuits are interconnected so that a first output signal is produced when both said first and second refresh circuits are energized, and a second output signal is produced when one of said first and second refresh circuits is deenergized.

8. The automatic vehicle control system of claim 1 wherein a logic gating circuit is interposed between said first and second computers and said compiling register for merging data transferred from said first and second computers into said third portion of said compiling register.

9. An automatic vehicle control system for a vehicle controlled from a central station,
   a data communication link between the vehicle and the central control station for transferring a vehicle performance reports from the vehicle to the central control station and transferring vehicle command messages from the central control station to the vehicle,
   an on-line control system in the vehicle for decoding vehicle command messages and assembling performance report messages,
   a speed control unit acting in response to the vehicle command messages decoded by the on-line vehicle control system for controlling acceleration and braking of the vehicle,
   a computer set in said central control station for computing the vehicle control data included in the vehicle command messages transmitted from the central control station to the vehicle, wherein the improvement comprises:

an identity word included in said vehicle command message transmitted from the central control station to the vehicle, said identity word including a first and second validating field having alternating and complementary data supplied from said computer set, said on-line control system including an input register providing storage means for said identity word, and a validating circuit providing means for validating the vehicle command message by testing the complementary data in said first and second validating fields.

10. The automatic vehicle control system of claim 9 wherein a first and a second refresh circuit is included in said validating circuit, said first refresh circuit energized by said first validating field, said second refresh circuit energized by said second validating field, said first and second refresh circuits being energized in a complementary manner corresponding to alternating data in said first and second validating fields.

11. The automatic vehicle control system of claim 10 wherein a first signal path is maintained through said first refresh circuit when said first refresh circuit is energized by said first validating field, and said first signal path is maintained for 100 milliseconds following the each energization of said first refresh circuit.

12. The automatic vehicle control system of claim 11 wherein said first signal path becomes discontinuous within 250 milliseconds following an energization last applied to said first refresh circuit by said first validating field.

13. The automatic vehicle control system of claim 9 wherein:

a first and a second computer is included in said computer set, said first computer providing alternating signals for said first validating field and said second computer providing alternating signals for said second validating field in said identity word of successive vehicle command messages.

14. The automatic vehicle control system of claim 13 wherein:

said first and second computers are coordinated to provide complementary signals to said first and second validating fields respectively.

15. The automatic vehicle control system of claim 13 wherein:

a compiler register is includer in said central control station and provides means for compiling said vehicle command message, said compiling register including a first portion for storing data transferred from said first computer, a second portion for storing data transferred from said second computer, and a third portion for storing data merged from both said first and second computers.

16. The atuomatic vehicle control system of claim 15 wherein:

said first validating field is included in said first portion of said compiling register and said second validating field is included in said second portion of said compiling register.

17. The automatic vehicle control system of claim 15 wherein:

a logic gating circuit is interposed between said compiling register and said firat and second computers to merge data transferred from said first and second computers into said third portion of said compiling register.

* * * * *